United States Patent
Yeung et al.

(10) Patent No.: US 10,488,975 B2
(45) Date of Patent: Nov. 26, 2019

(54) TOUCH GESTURE DETECTION ASSESSMENT

(71) Applicant: Intel Corporation, Santa Clara, CA (US)

(72) Inventors: Fai Yeung, Palo Alto, CA (US); Jinkui Ren, Shanghai (CN); Tingqian Li, Songjiang District (CN); Tong Chen, Shanghai (CN); Gregory Meunier, Toulouse (FR)

(73) Assignee: Intel Corporation, Santa Clara, CA (US)

( * ) Notice: Subject to any disclaimer, the term of this patent is extended or adjusted under 35 U.S.C. 154(b) by 15 days.

(21) Appl. No.: 15/774,667

(22) PCT Filed: Dec. 23, 2015

(86) PCT No.: PCT/CN2015/098381
§ 371 (c)(1),
(2) Date: May 9, 2018

(87) PCT Pub. No.: WO2017/107086
PCT Pub. Date: Jun. 29, 2017

(65) Prior Publication Data
US 2018/0329565 A1  Nov. 15, 2018

(51) Int. Cl.
*G06F 3/045* (2006.01)
*G06F 3/041* (2006.01)
(Continued)

(52) U.S. Cl.
CPC .......... *G06F 3/0416* (2013.01); *G06F 3/017* (2013.01); *G06F 3/0414* (2013.01); *G06F 3/0418* (2013.01); *G06F 3/04883* (2013.01)

(58) Field of Classification Search
CPC .......... G06F 1/1694; G06F 3/01; G06F 3/017; G06F 3/0416; G06F 3/048; G06F 3/0488;
(Continued)

(56) References Cited

U.S. PATENT DOCUMENTS 6,029,214 A * 2/2000 Dorfman ............. G06F 3/03545
345/173
7,847,787 B1 * 12/2010 Boillot .................... G06F 3/043
345/156
(Continued)

FOREIGN PATENT DOCUMENTS

CN   102317977 A   1/2012
CN   102985897 A   3/2013
(Continued)

OTHER PUBLICATIONS

"International Application Serial No. PCT/CN2015/098381, International Search Report dated Sep. 27, 2016", 4 pgs.
(Continued)

*Primary Examiner* — Joe H Cheng
(74) *Attorney, Agent, or Firm* — Schwegman Lundberg & Woessner, P.A.

(57) ABSTRACT

Embodiments are directed to gesture recognition in a computing device. Touch-based input by the user is monitored based on an output from a touch sensor. Gestures are directed from among the touch-based input. The detected gestures are analyzed to assign gesture characteristic profiles to the detected gestures according to profiling criteria. A sequential event log is tabulated representing counts of series of gestures based on assigned characteristic profiles and on temporal sequencing of the gestures. Circumstances for invocation of gesture detection re-calibration are assessed based on the tabulated series of gestures.

25 Claims, 12 Drawing Sheets

(51) Int. Cl.
*G06F 3/01* (2006.01)
*G06F 3/0488* (2013.01)

(58) Field of Classification Search
CPC .. G06F 3/04883; G06K 9/00; G06K 9/00006; G06K 9/68
See application file for complete search history.

(56) References Cited

U.S. PATENT DOCUMENTS

| | | | |
|---|---|---|---|
| 2004/0193413 A1* | 9/2004 | Wilson | G06F 3/017 704/243 |
| 2007/0259716 A1* | 11/2007 | Mattice | G06F 3/013 463/36 |
| 2007/0259717 A1* | 11/2007 | Mattice | A63F 3/00157 463/36 |
| 2010/0306710 A1 | 12/2010 | Poot | |
| 2011/0093820 A1* | 4/2011 | Zhang | A63F 13/06 715/863 |
| 2012/0032979 A1* | 2/2012 | Blow | G06F 1/1626 345/647 |
| 2013/0135218 A1* | 5/2013 | Jain | G06F 3/0488 345/173 |
| 2013/0194173 A1* | 8/2013 | Zhu | G06F 3/011 345/156 |
| 2014/0009378 A1 | 1/2014 | Chew | |
| 2016/0058158 A1* | 3/2016 | Tomita | H04N 5/23222 348/78 |

FOREIGN PATENT DOCUMENTS

| | | |
|---|---|---|
| CN | 104380248 A | 2/2015 |
| WO | WO-2017107086 A1 | 6/2017 |

OTHER PUBLICATIONS

"International Application Serial No. PCT/CN2015/098381, Written Opinion dated Sep. 27, 2016", 4 pgs.

* cited by examiner

|  | mag1_threshold | mag2_threshold | P (%) |
|---|---|---|---|
| Strong | 500 | 450 | 50 |
| Medium (default) | 400 | 350 | 67 |
| Weak | 300 | 300 | 75 |

*FIG. 7*

| Profile | Transition between Tapping Events | | | | | | | |
|---|---|---|---|---|---|---|---|---|
| | Tap0->1 | Tap1->2 | Tap2->3 | Tap3->3 | Tap1->0 | Tap2->0 | Tap3->0 |
| (S)trong | Stap01 | Stap12 | Stap23 | Stap33 | Stap10 | Stap20 | Stap30 |
| (M)edium | Mtap01 | Mtap12 | Mtap23 | Mtap33 | Mtap10 | Mtap20 | Mtap30 |
| (W)eak | Mtap01 | Mtap12 | Mtap23 | Mtap33 | Mtap10 | Mtap20 | Mtap30 |

*FIG. 9*

| | | |
|---|---|---|
| $e_{1,2} = (1,2) = Stap01$ | $e_{1,5} = (1,5) = Mtap01$ | $e_{1,8} = (1,8) = Wtap01$ |
| $e_{2,3} = (2,3) = Stap12$ | $e_{5,6} = (5,6) = Mtap12$ | $e_{8,9} = (8,9) = Wtap12$ |
| $e_{3,4} = (3,4) = Stap23$ | $e_{6,7} = (6,7) = Mtap23$ | $e_{9,10} = (9,10) = Wtap23$ |
| $e_{4,4} = (4,4) = Stap33$ | $e_{7,7} = (7,7) = Mtap33$ | $e_{10,10} = (10,10) = Wtap33$ |
| $e_{2,11} = (2,11) = Stap10$ | $e_{5,11} = (5,11) = Mtap10$ | $e_{8,11} = (8,11) = Wtap10$ |
| $e_{3,11} = (3,11) = Stap20$ | $e_{6,11} = (6,11) = Mtap20$ | $e_{9,11} = (9,11) = Wtap20$ |
| $e_{4,11} = (4,11) = Stap30$ | $e_{7,11} = (7,11) = Mtap30$ | $e_{10,11} = (10,11) = Wtap30$ |

*FIG. 11*

TOUCH GESTURE DETECTION ASSESSMENT

This application is a U.S. National Stage Filing under 35 U.S.C. 371 from International Application No. PCT/CN2015/098381, filed on Dec. 23, 2015, and published as WO 2017/107086 on Jun. 29, 2017, which application is incorporated herein by reference in its entirety.

TECHNICAL FIELD

Embodiments described herein generally relate to information processing equipment and associated methodology and, more particularly, to the detection of user input using touch sensing.

BACKGROUND

In recent years, the world has experienced an explosive growth in the popularity of mobile computing devices, such as mobile phones, tablets, and other form-factor devices, such as smart watches, smart glasses, and the like. These devices tend to use touch sensing as one of their primary user-input mechanisms. Touch-sensitive sensors will generally measure the location of taps, swipes, and other gestures produced by the user.

Detecting finger gestures accurately is of utmost importance to device designers since a user's perception of the quality of a device is closely bound to the user's personal use experience. Finger gesture recognition also presents some critical challenges for mobile devices since users tend to have different physical characteristics and habitual behavior. For example, users may have different skin textures, affix a wearable device differently, apply a gesture with different degrees of force, or tap the device in different patterns. These kinds of variations complicate the design of mobile devices for accurate gesture recognition.

Presently, touch-sensitive devices offer a calibration, or optimization algorithm to tune their responsiveness to user-applied touch gestures for specific users. While a fully-tuned touch gesture detection algorithm may accommodate the majority, say 90%, of the user population reasonably well, there remains a small but very vocal group of users who struggle with incorrectly-interpreted gestures. Properly addressing the user experience issues, particularly from a disgruntled group, becomes a high priority in managing the brand image for a wearable device.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings.

FIG. 7 is a table listing various example parameter values for tap gesture detection according to an embodiment.

FIG. 9 is a table illustrating the various counters corresponding to each sequential tapping event depicted in FIG. 8 according to some embodiments.

FIG. 11 is a table associating the edges of the diagram of FIG. 10 with the event sequences shown in the diagram of FIG. 8 according to an example embodiment.

DETAILED DESCRIPTION

Aspects of the embodiments described herein are directed to touch-input gesture detection in computing devices. Hereinafter, touch-input gestures by the user, as inputs to one or more sensors of a computing device, may be referred to simply as gestures.

One aspect of the embodiments is directed to automation of the re-calibration process for gesture recognition in computing devices. In some embodiments, the re-calibration is automatically initiated, meaning initiated without a specific user command in every instance, after an initial calibration process that is administered at an initial setup session with the user. In related embodiments, the calibration operation for gesture recognition is adaptive in nature. It detects a user's gesture usage and pattern, and adaptively switches to another calibration profile if the new profile is more appropriate for the user.

Some embodiments provide an opportunity for a gesture recognition algorithm to fine-tune or modify calibrated configuration settings when the algorithm detects a change in user's gesture pattern.

In related embodiments, the gesture recognition re-calibration initiation is based on a recognition that a user tends to exhibit certain behaviors when the existing gesture recognition functionality fails to give the user the correct response as expected. The user will attempt to correct the gesture, for example, by applying the same gesture again. This kind of behavior-based monitoring according to some embodiments may advantageously reduce the occurrence of gesture recognition failures or false gesture detections.

A computing device in the present context may take any of a variety of device types. For instance, it may be a multi-functional device such as a smartphone, tablet, laptop, desktop PC, smartwatch, wearable form factor (e.g., smart glasses, or a device embedded in garment), etc. A computing device may have several integrated data capture devices.

Figure 1A:
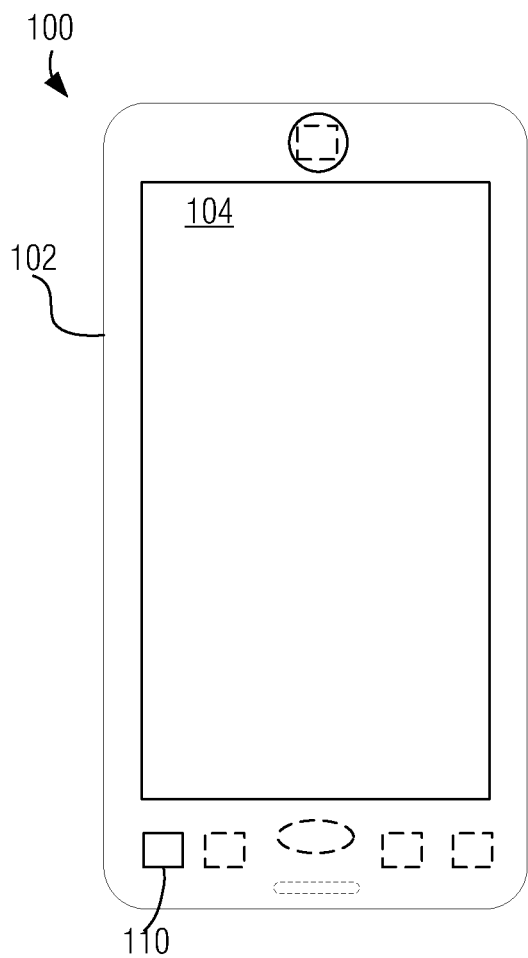
FIG. 1A is a block diagram illustrating some of the components of an example computing device according to some embodiments.

FIG. 1A is a block diagram illustrating some of the components of an example computing device 100 according to an embodiment. Computing device 100 is illustrated as a smartphone in this example, through it will be understood that computing device 100 is representative of other types of computing devices, which may have more or fewer data capture devices or other features than exemplary computing device 100. Computing device 100 has a housing 102 that encloses the interior components. Housing 102 may provide access to the interior of device 100 to some degree. For instance, in devices with a user-replaceable battery, flash memory card, or subscriber identity module (SIM) card, housing 102 may include a user-removable cover. In devices having a design that does not facilitate user access to the interior, housing 102 may nonetheless have a provision for permitting access to technicians so that certain components may be repaired or replaced if needed.

Computing device 100 further includes touchscreen 104, which may form a part of the overall enclosure of device 100 in cooperation with housing 102. Touchscreen 104 includes hardware that functions as an output device (e.g., an LED screen for visual display, power and controller circuitry, etc.), and an input device generally layered over the visual display and formed from a suitable touch or proximity-sensitive technology (e.g., capacitive, resistive, optical, ultrasonic, etc.), along with the corresponding detection and power circuitry. Additionally, computing device 100 includes a user input device, which in this example represents one or more user-operable input devices, such as button(s), keypad, keyboard, trackpad, mouse, etc.

As further depicted in FIG. 1, computing device 100 may have several data capture devices, such as sensing transducers, the physical stimulation of which produces signaling that may be sampled, digitized, and stored as captured data. Accelerometer 110 may include a multi-axis sensor that produces signaling in response to changes in motion, and electronics to sample and digitize that signaling. The sensor may be a micro electro-mechanical system (MEMS)-based device utilizing capacitive, piezoelectric, or other suitable technology to produce electrical signaling, that is then amplified and processed with suitable analog and digital circuitry. Other sensors may include deformation or strain sensors, acoustic sensors, and the like.

Figure 1B:
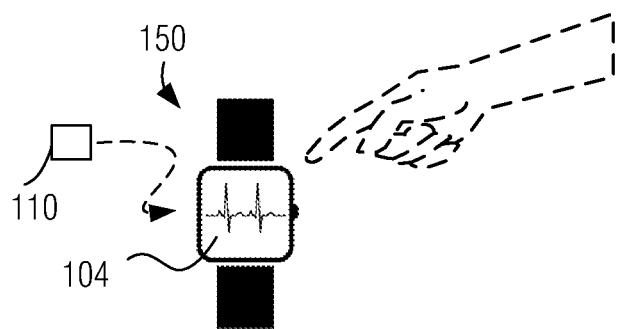
FIG. 1B is a diagram illustrating a wearable computing device according to some embodiments.

FIG. 1B is a diagram illustrating a computing device that has a wearable form factor. As depicted, smartwatch 150 may also include a touchscreen 104 and an accelerometer 110.

Figure 2:
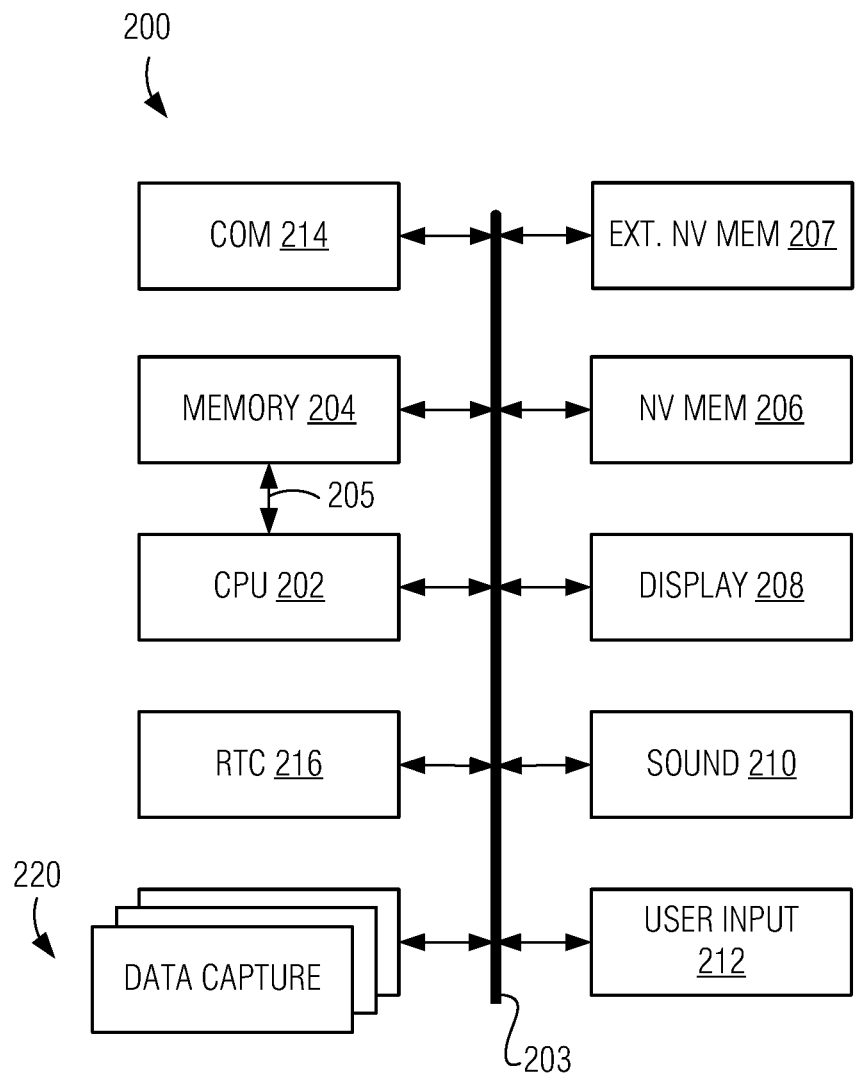
FIG. 2 is a block diagram illustrating an exemplary system architecture of a computing devices such as the devices of FIGS. 1A and 1B, according to an embodiment.

FIG. 2 is a block diagram illustrating an exemplary system architecture 200 of computing devices 100 or 150 according to some embodiments. Depending on the form factor and nature of computing devices 100, 150 not every component described below may be present. Central processor unit (CPU) 202 includes one or more microprocessors on which the overall functionality of computing device 100, 150 is executed. CPU 202 is formed from hardware that is electrically interfaced with system link 203, which carries data and control signaling between the various components. As illustrated, system link 203 is similarly interfaced with each of the other components of system architecture 200. Memory 204 includes working memory space, and is constructed from suitable high-speed memory devices such as synchronous dynamic random access memory (SDRAM). In the embodiment illustrated, CPU 202 may access memory 204 using high-speed interface 205. Non-volatile memory 206 is constructed using read-only memory (ROM), electrically-erasable programmable read-only memory (EEPROM), flash memory or other suitable non-volatile storage technology. Non-volatile memory 206 stores system and application software that is executed by CPU 202 and, in some cases, by processors present in one or more other components.

External non-volatile memory 207, where available, includes an interface such as a secure digital (SD) card slot, which may accept removable storage media to be used as additional non-volatile data storage.

Display 208 includes display 104 and circuitry for interfacing the display 104 with the system, as well as video driving circuitry. Sound 210 contains circuitry for driving the audio output to a speaker or headphones, and the circuitry for interfacing with the system. User input 212 contains the circuitry for interfacing with input devices such as touchscreen input device 104. Communications block 214 represents communications circuitry and circuitry for interfacing the communications circuitry with the system. Communications block 214 may include a radio for communicating over a cellular network such as a network designed according to the Long-Term Evolution (LTE), LTE-Advanced, 5G or Global System for Mobile Communications (GSM) families of standards. Also, communications circuitry 214 may include a Wi-Fi communications radio according to the IEEE 801.11 family of standards, or a Bluetooth radio circuit according to the IEEE 802.15 family of standards. Real-time clock 216 includes circuitry that provides a clock that maintains the current date and time, and that interfaces the clock to the system.

Data capture devices 220 are integrated with computing device 200. According to various embodiments, data capture devices 220 include a plurality of different types of sensing transducers and their associated processing and interface circuitry, such as a accelerometer 110, as well as a camera, GPS, and biometric sensors according to various embodiments.

The processing circuitry associated with each corresponding transducer may include amplification, buffering, filtering, or other signal-conditioning circuitry to receive the raw analog signal from the corresponding transducer and prepare the analog signaling for digitization, analog-to-digital conversion circuitry to perform sampling, quantization, and digital encoding, and, in some cases, further processing to produce a digital signal representing the physical phenomenon being measured by the transducer in a form that is readable by CPU 202.

Figure 3:
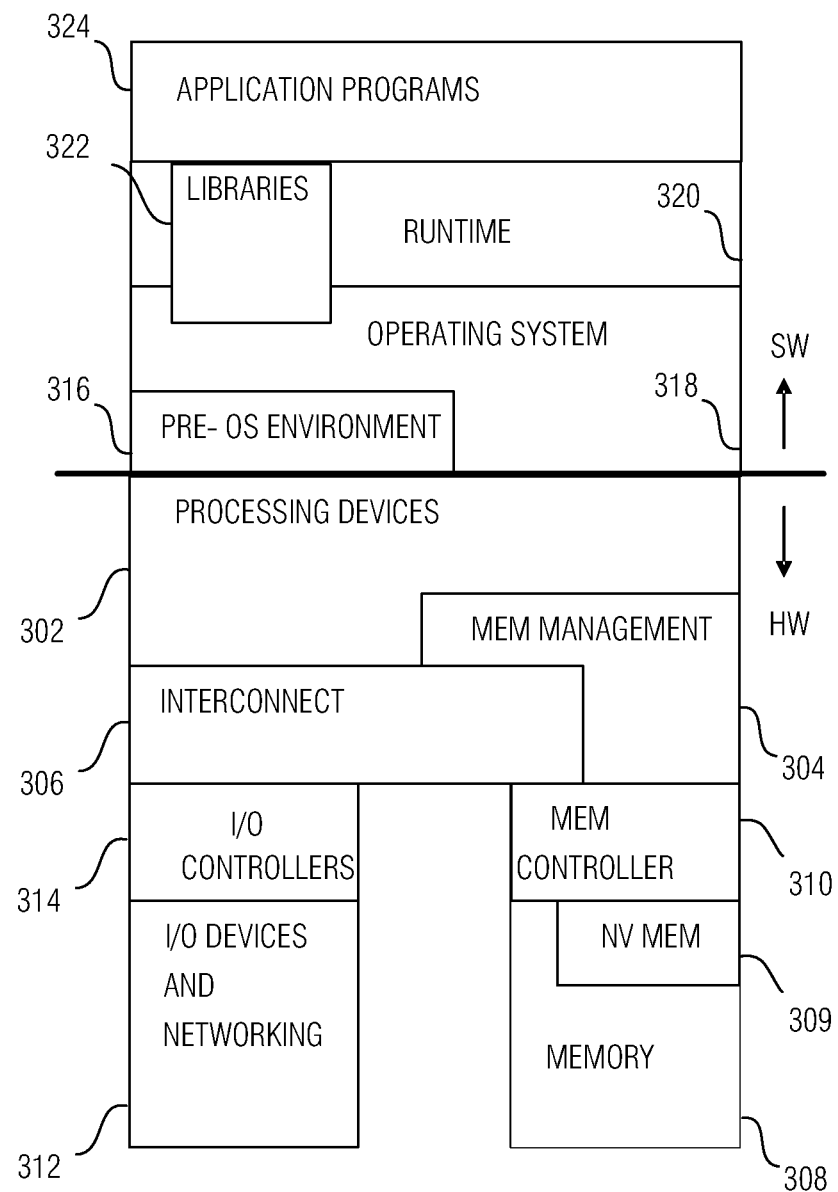
FIG. 3 is a diagram illustrating an exemplary hardware and software architecture of a computing device such as the one depicted in FIG. 2, in which various interfaces between hardware components and software components are shown.

FIG. 3 is a diagram illustrating an exemplary hardware and software architecture of a computing device such as the one depicted in FIG. 2, in which various interfaces between hardware components and software components are shown. As indicated by HW, hardware components are represented below the divider line, whereas software components denoted by SW reside above the divider line. On the hardware side, processing devices 302 (which may include one or more microprocessors, digital signal processors, etc., each having one or more processor cores, are interfaced with memory management device 304 and system interconnect 306. Memory management device 304 provides mappings between virtual memory used by processes being executed, and the physical memory. Memory management device 304 may be an integral part of a central processing unit which also includes the processing devices 302.

Interconnect 306 includes a backplane such as memory, data, and control lines, as well as the interface with input/output devices, e.g., proprietary bus, PCI, USB, etc. Memory 308 (e.g., dynamic random access memory—DRAM) and non-volatile memory 309 such as flash memory (i.e., electrically-erasable read-only memory—EEPROM, NAND Flash, NOR Flash, etc.) are interfaced with memory management device 304 and interconnect 306 via memory controller 310. This architecture may support direct memory access (DMA) by peripherals in some embodiments. I/O devices, including video and audio adapters, non-volatile storage, external peripheral links such as USB, Bluetooth, etc., as well as network interface devices such as those communicating via Wi-Fi or LTE-family interfaces, are collectively represented as I/O devices and networking 312, which interface with interconnect 306 via corresponding I/O controllers 314.

On the software side, a pre-operating system (pre-OS) environment 316, which is executed at initial system start-up and is responsible for initiating the boot-up of the operating system. One traditional example of pre-OS environment 316 is a system basic input/output system (BIOS). In present-day systems, a unified extensible firmware interface (UEFI) may be implemented. Operating system (OS) 318 provides a kernel that controls the hardware devices, manages memory access for programs in memory, coordinates tasks and facilitates multi-tasking, organizes data to be stored, assigns memory space and other resources, loads program binary code into memory, initiates execution of the application program which then interacts with the user and with hardware devices, and detects and responds to various defined interrupts. Also, operating system 318 provides device drivers, and a variety of common services such as those that facilitate interfacing with peripherals and networking, that provide abstraction for application programs so that the applications do not need to be responsible for handling the details of such common operations. Operating system 318 additionally provides a graphical user interface (GUI) that facilitates interaction with the display, sound, and touch and motion input devices.

Runtime system 320 implements portions of an execution model, including such operations as putting parameters onto the stack before a function call, the behavior of long-term storage input/output (I/O), and parallel execution-related behaviors. Runtime system 320 may also perform support services such as type checking, debugging, or code generation and optimization.

Libraries 322 include collections of program functions that provide further abstraction for application programs. These include shared libraries, dynamic linked libraries (DLLs), for example. Libraries 322 may be integral to the operating system 318, runtime system 320, or may be added-on features, or even remotely-hosted. Libraries 322 define an application program interface (API) through which a variety of function calls may be made by application programs 324 to invoke the services provided by the operating system 318. Application programs 324, oftentimes referred to as apps, are those programs that perform useful tasks for users, beyond the tasks performed by lower-level system programs that coordinate the basis operability of the computing device itself.

Figure 4:
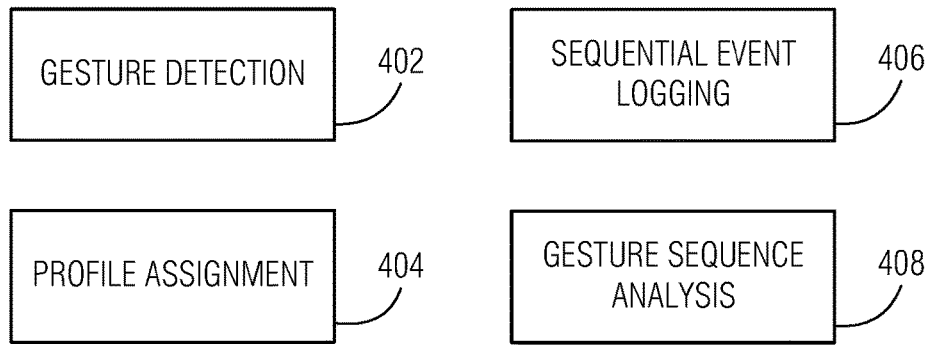
FIG. 4 is a block diagram illustrating a set of engines that may be implemented using the computing hardware of a computing device that may be configured, or configurable according to executing, or installed, software or firmware program instructions according to some embodiments.

Examples, as described herein, may include, or may operate on, logic or a number of components, engines, or modules, which for the sake of consistency are termed engines, although it will be understood that these terms may be used interchangeably. FIG. 4 is a block diagram illustrating a set of engines that may be implemented using the computing hardware of a computing device that may be configured, or configurable according to executing, or installed, software or firmware program instructions according to some embodiments.

Engines may be hardware, software, or firmware communicatively coupled to one or more processors in order to carry out the operations described herein. Engines may be hardware engines, and as such engines may be considered tangible entities capable of performing specified operations and may be configured or arranged in a certain manner. In an example, circuits may be arranged (e.g., internally or with respect to external entities such as other circuits) in a specified manner as an engine. In an example, the whole or part of one or more computer systems (e.g., a standalone, client or server computer system) or one or more hardware processors may be configured by firmware or software (e.g., instructions, an application portion, or an application) as an engine that operates to perform specified operations. In an example, the software may reside on a machine-readable medium. In an example, the software, when executed by the underlying hardware of the engine, causes the hardware to perform the specified operations. Accordingly, the term hardware engine is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. With reference to FIG. 3, for instance, an engine may include one, or any combination, of the blocks depicted, so long as at least one block from the HW side is included.

Considering examples in which engines are temporarily configured, each of the engines need not be instantiated at any one moment in time. For example, where the engines comprise a general-purpose hardware processor configured using software; the general-purpose hardware processor may be configured as respective different engines at different times. Software may accordingly configure a hardware processor, for example, to constitute a particular engine at one instance of time and to constitute a different engine at a different instance of time.

In the diagram of FIG. 4, gesture detection engine 402 is configured with hardware and software components, and operative, to monitor an accelerometer, deformation/strain sensor, display touchscreen, or other suitable touch detection input by the user, and to apply a set of defined criteria to discriminate between user gesture input, or other events picked up by the sensor(s). Notably, in some embodiments, one, or a combination, of different sensors may be monitored simultaneously (or nearly-simultaneously within the limits of the computing device) and integrated to produce a diverse multi-modal input.

Profile assignment engine 404 is configured with hardware and software components, and operative, to analyze the detected gesture(s) by gesture detection engine 402 and assign one or more gesture characteristic profiles according to defined profile criteria.

Sequential event logging engine 406 is configured with hardware and software components, and operative, to collect, tabulate, and count one or more series of sequential gestures according to each gesture's profile characteristic, and according to each gesture's temporal position in a sequence of gestures. The result of this tabulation and counting may be a data structure populated with counts of various gestures (or non-gestures) data that may be indicative of user behavior, in terms of the collection of input gestures.

Gesture sequence analysis engine 408 is configured with hardware and software components, and operative, to analyze the data collected by sequential event logging engine to assess any failed detections of gestures, any false detection of gestures, and to detect circumstances for invoking re-calibration of gesture detection. The gesture detection engine 402 may then utilize the re-calibration result to improve its gesture-recognition functionality.

Various example embodiments are described in detail below in the context of double-tapping gesture recognition. It should be noted that other embodiments may apply similar principles to the recognition of other types of gestures as well, including such gestures as swipe patterns, shaking of the device, rotation of the device, or others touch or device handling-based input.

Figure 5:
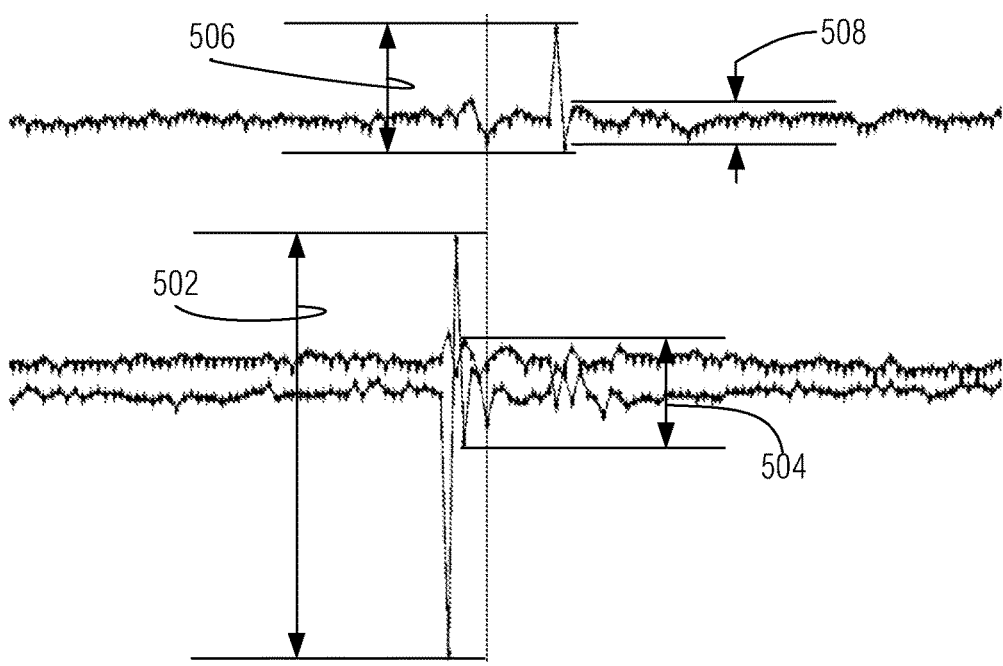
FIG. 5 is a time series diagram illustrating example outputs of a multi-axis motion sensor that observes a double-tapping gesture according to some embodiments.

FIG. 5 is a time series diagram illustrating example outputs of a multi-axis motion sensor that observes a double-tapping gesture according to some embodiments. As depicted in the timing diagram, each time-series trace represents a corresponding axis of measurement. there are four parameters used in detecting a double-tapping gesture: Mag1 502 representing a magnitude of a first peak; Range1_max 504 representing the magnitude of the greatest portion of the residual signal following the first peak, also referred to herein as the tail; Mag2 506 representing a second peak representing the second tap (occurring close in time to the first tap) and Range2_max 508 representing the maximum magnitude of the second tap signal's tail.

In detecting taps (e.g., by gesture detection engine 402), various thresholds are applied to the measured signal parameters according to some embodiments: Mag1_threshold and Mag2_threshold are the minimum acceptance thresholds for the first and second taps, respectively. For example, if Mag1 502 exceeds Mag1_threshold, a first tapping is possibly recognized. Another threshold, P, is the qualifying cut-off percentage of the signal magnitude, e.g., Mag1 502, in proportion to the maximum tail magnitude, e.g., Range1_max 504.

The signal magnitudes Mag1 502 and Mag2 506 are indicative of the force of each respective tap, for example, how heavily the user taps on the device. The values of Mag1 502, Mag2 506, Mag1_threshold and Mag2_threshold may be varied for each user to improve tapping detection.

The tail magnitudes Range1_max 504 and Range2_max 508, and the qualifying cut-off percentage P, are indicative of user characteristics, such as the flexibility and other properties of the user's skin, as well as representing how the device may be held, worn, or fastened, with respect to the user.

Figure 6:
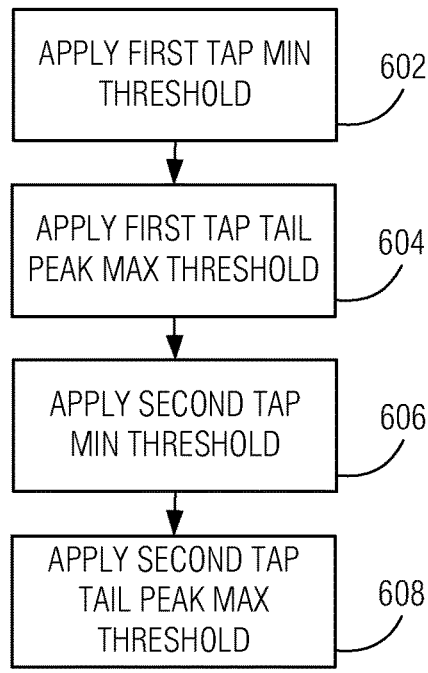
FIG. 6 is a flow diagram illustrating an example process of detecting a double-tapping gesture according to some embodiments.

FIG. 6 is a flow diagram illustrating an example process of detecting a double-tapping gesture according to some embodiments. At 602, the first tap minimum threshold, Mag1_threshold, is applied, meaning that Mag1 502 is compared against Mag1_threshold. The measured peak of the first tap should meet or exceed Mag1_threshold to qualify as a tap. At 604, the first tail maximum threshold, P is applied, where Range1_max 504 is compared against threshold P, which is determined specifically for this application based on the Mag1 502 value. The threshold P may be defined as a percentage of Mag1_threshold, for example. A maximum tail magnitude range1_max that falls below threshold P may qualify the tap as valid. At 606, the second tap minimum threshold, Mag2_threshold, is applied to the second potential tap signal peak. At 608, the tail threshold P is applied to the second peak's tail. Here, the threshold P may be defined as a percentage of Mag2_threshold.

FIG. 7 is a table listing various example parameter values for tap gesture detection according to an embodiment. Each row represents variations in the parameter values according to assigned profiles of strong, medium, and weak. Profile assignment engine 404 may make the profiling determinations according to an example embodiment.

Figure 8:
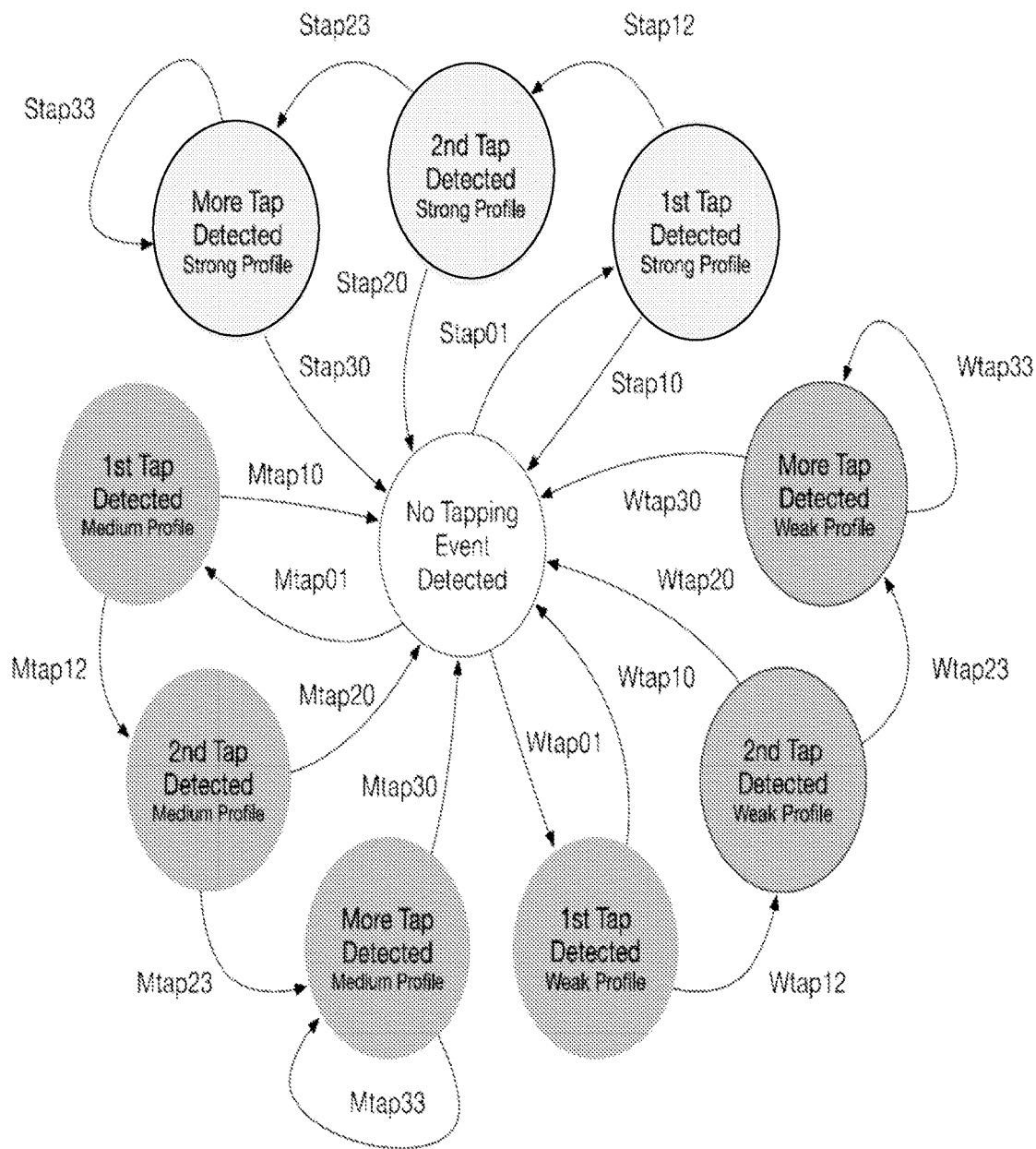
FIG. 8 is a state diagram illustrating various potential sequences of tapping gestures according to some embodiments.

FIG. 8 is a state diagram illustrating various potential sequences of tapping gestures according to some embodiments. The transitions of tapping events are illustrated as arrows. The sequences are as illustrated as first tap, second tap, and third (or subsequent tap) for weak, medium, and strong profile characteristics. There is also a non-tap event shown in the center. After each tap, the non-tap state may follow if a subsequent tap is not registered.

The labeling convention in FIG. 8 is as follows:
{St(rong), M(edium), W(eak)}tap{N} {M},
where N and M represent the sequential advance from the Nth to the Mth sequential tap.

Accordingly, each connecting arrow between two events is associated with a counter registering the number of transitions between the two specific tapping event states. The statistics of all tapping events may be compiled from these counters by sequential event logging engine 406. FIG. 9 is a table illustrating the various counters corresponding to each sequential tapping event depicted in FIG. 8 according to some embodiments.

As an example of the operation of an exemplary system, all the counters are initialized to zero. When a tap is detected by gesture detection engine 402, the tapping event will be fed to each of the gesture recognition algorithms, e.g., strong, medium, and weak profiles for profile assignment engine 404. If the input is qualified as a tapping event, it will be registered independently for that profile and the relevant counter will increment by one by sequential event logging engine 406. For example, if a tapping event is qualified according to both weak and medium profiles but not the strong profile, the following edge counters will increment by one: Mtap01++; Wtap01++; if three or more tapping events are detected consecutively, the counter in Tap3→3 column will increment recurrently.

Figure 10:
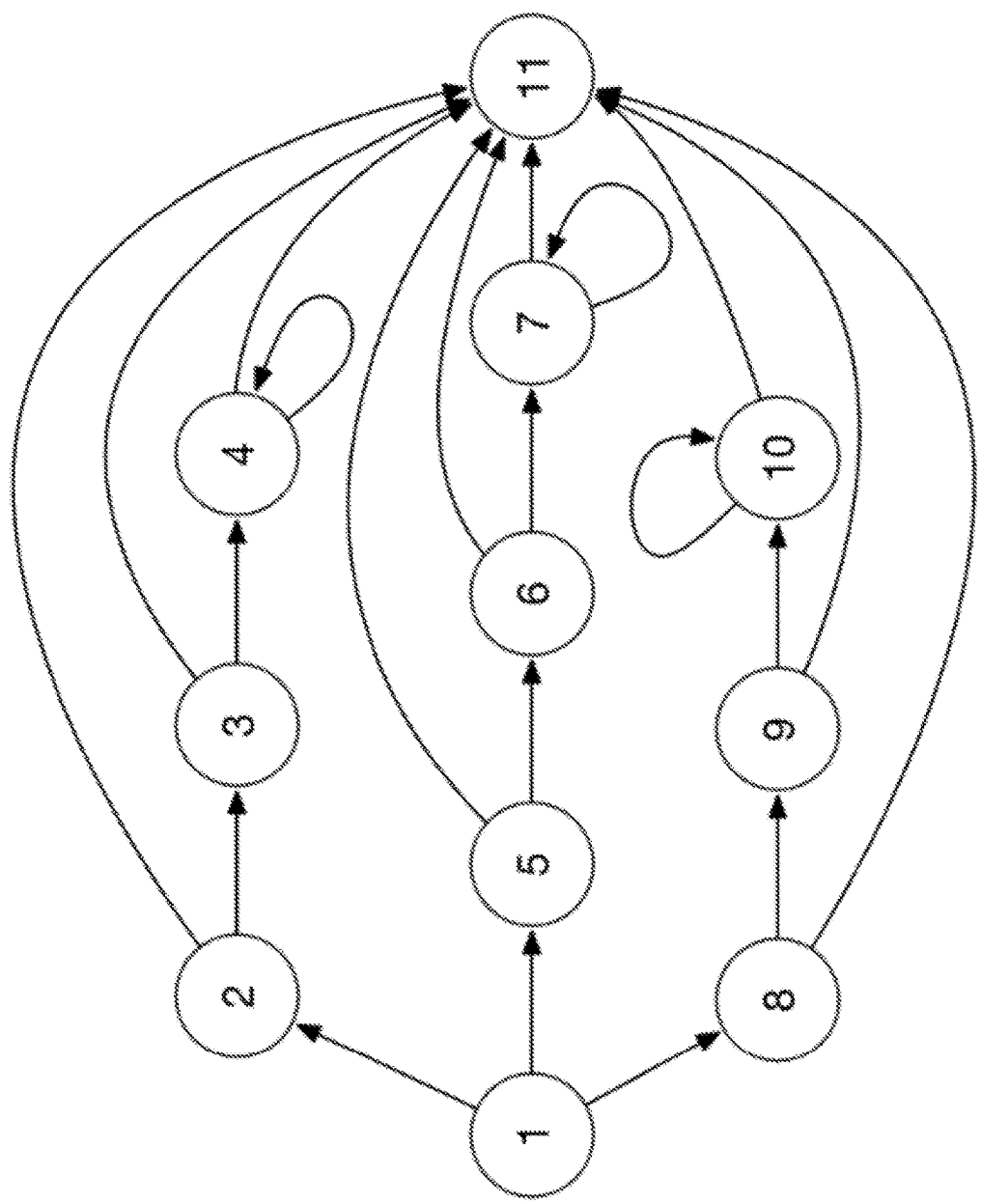
FIG. 10 is a graph diagram illustrating sequential relationships between gesture events, including the temporal ordering of those events according to some embodiments.

FIG. 10 is a graph diagram illustrating sequential relationships between gesture events, including the temporal ordering of those events according to some embodiments. The counters for tapping events may be represented by directed edges, where $e_{2,3}=(2,3)$ indicates the direct edge from Node 2 and 3, and corresponds to the counter Stap12 between the first and second taps in the strong profile according to an example embodiment. FIG. 11 is a table associating the edges of the diagram of FIG. 10 with the event sequences shown in the diagram of FIG. 8 according to an example embodiment.

When the user profile for gesture recognition is chosen incorrectly, many false negatives (e.g., gesture detection failures) or false positives (e.g., improper gesture detections) are expected. In some embodiments, a priori user feedback information is used to recognize the false negative and false positive cases.

Table 1 below illustrates example false negative and false positive scenarios.

TABLE 1

| Scenario | Assumed User Behavior | Example |
|---|---|---|
| False Negative | Invoke more taps consecutively | Invoke many taps in a short period, say 1 second but stop after a double tap is |

TABLE 1-continued

| Scenario | Assumed User Behavior | Example |
|---|---|---|
| | until a double tap is detected. | detected. |
| False Positive | Perform remedy actions to offset the effect of double tap. | Quickly dismiss the window caused by the double tapping or swipe away to go back to the previous screen. |

As an example of the use of the a priori user feedback, failed detections (false negative scenario) of gestures may be assessed based on the tabulated and counted series of gestures by detection of successful gesture attempts in close succession following events that fail to meet gesture detection criteria.

In the false positive scenario, any false detections of gestures may be assessed based on the tabulated and counted series of gestures by detection of undo actions (e.g., use of the "back" touch command, swipe-away gesture, etc.) in close succession to detected gestures.

According to some embodiments, gesture sequence analysis engine 408 applies these criteria to determine a need for recalibration. If a tabulated quantity of false positives or false negatives are observed within some defined time period, gesture sequence analysis engine 408 may initiate a call for recalibration. For example, if there are four occurrences of erroneous tapping detection on the same day of usage, an attempt for recalibration will be initiated. A likely outcome of the recalibration is a new tapping profile will be chosen. No adjustment will be performed if a better tapping profile cannot be found.

For the example scenario when the number of false negatives exceeds the threshold, gesture sequence analysis engine 408 may adjust the tapping profile.

In an embodiment, the problem of selecting tapping profile is solved as a single-source shortest-path problem according to an example algorithm that may be carried out by gesture sequence analysis engine 408. For instance, the cost for traversing an edge is calculated as $c_{i,j} = e_{MAX} - e_{i,j} + 1$, where $c_{i,j}$ is the cost for an relevant edge between Node i and j in a path, $e_{MAX}$ is the maximum count for all edges included in the paths being considered, and $e_{ij}$ is the tapping count for the edge.

Figure 12:
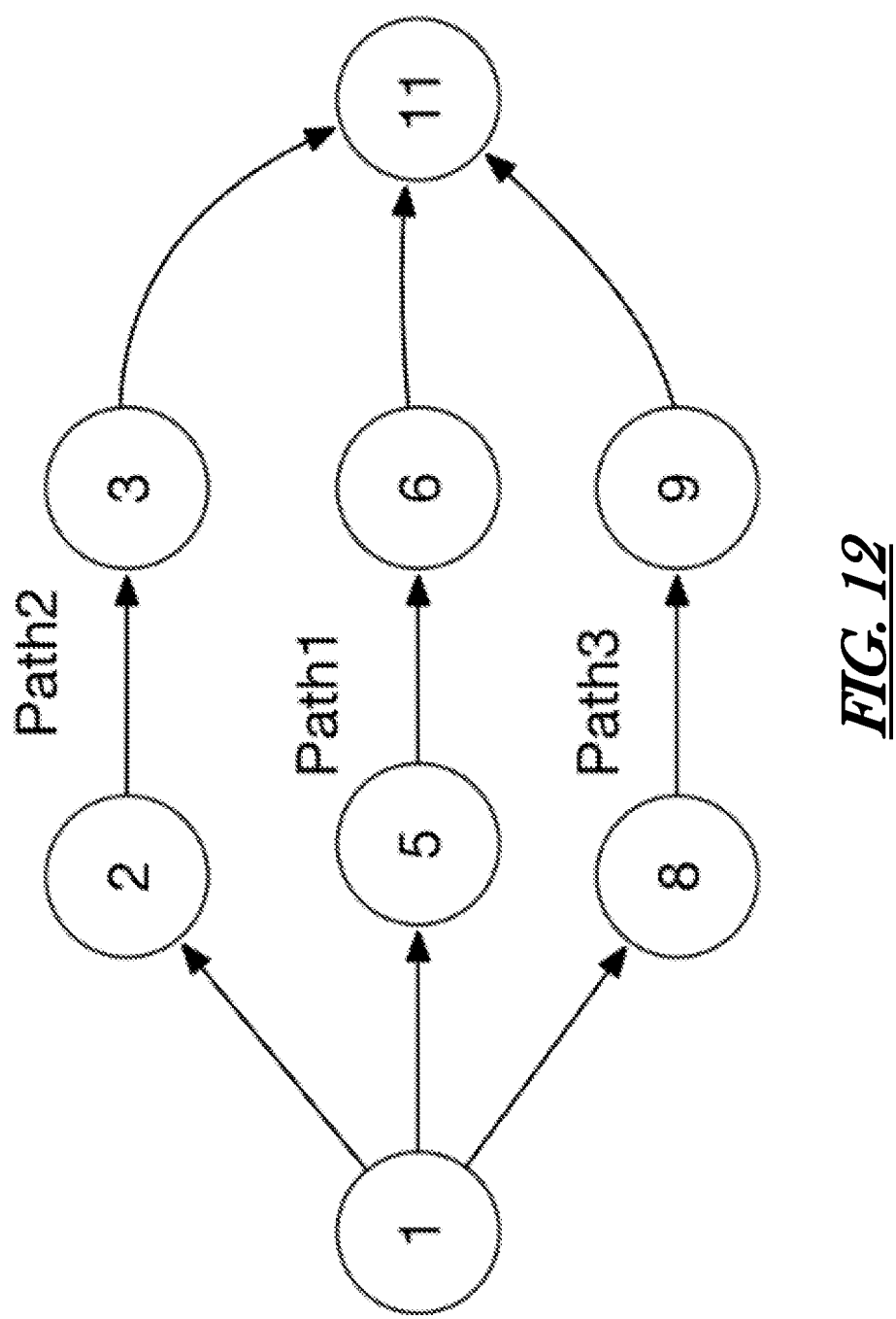
FIG. 12 is a diagram illustrating a reduced graph representing tapping events of interest for recalibrating double-tapping gesture detection according to an example embodiment.

For recalibrating a double-tap detection algorithm, irrelevant tapping events, such as single taps, and the third (and subsequent taps) may be ignored. FIG. 12 is a diagram illustrating a reduced graph representing tapping events of interest for recalibrating double-tapping gesture detection according to an example embodiment.

The cost associated with each path may be expressed as:

$$\text{path}_k = \Sigma_{m=1}^{3} c_{i,j}. \quad \text{(Eq. 1)}$$

In an example technique, the approach is reduced to finding the single-source shortest-path with the weighted path length. A greedy method such as Dijkstra's Algorithm may be applied to solve the best path (with the lowest cost), for example. If the path is different from the previously used one, the new tapping profile corresponding to the shortest path will be used in the double tapping algorithm.

In another scenario when the number of false positives exceeds the threshold, one example approach applies another path formula in its attempt to adjust the tapping profile. The cost associated with each path becomes:

$$\text{path}_k = \Sigma_{m=1}^{3} e_{i,j}. \quad \text{(Eq. 2)}$$

The edge counter values may be used directly as the weighted path length in the single-source shortest-path problem solving.

Figure 13:
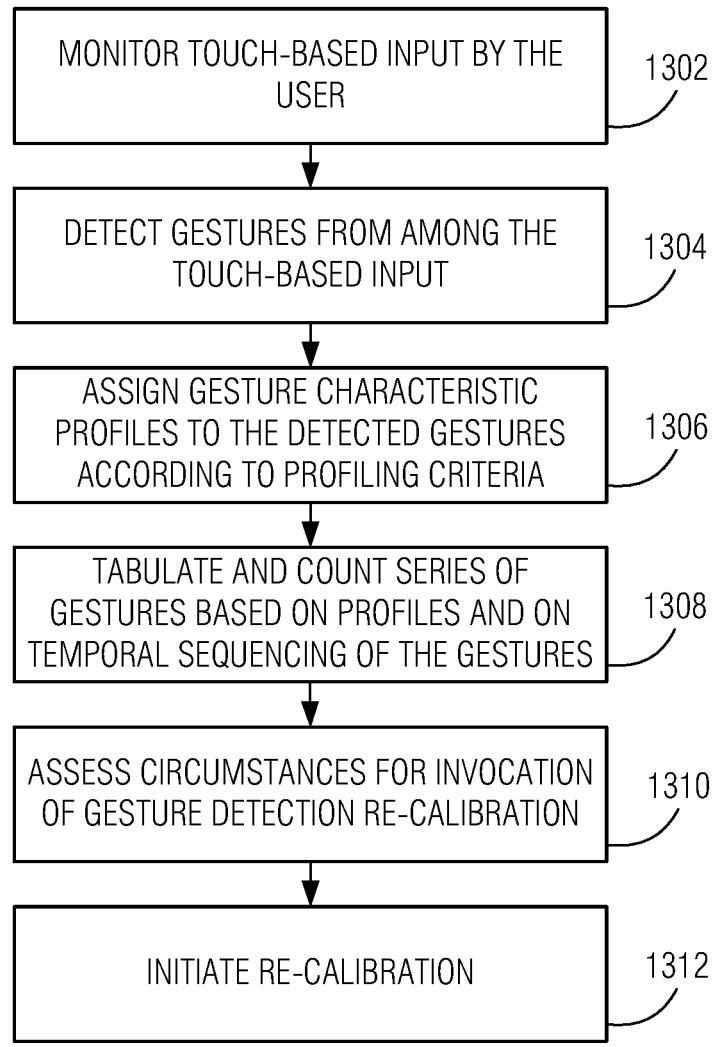
FIG. 13 is a flow diagram illustrating a general process performing gesture recognition assessment according to some embodiments.

FIG. 13 is a flow diagram illustrating a general process performing gesture recognition assessment according to some embodiments. At 1302, touch-based input by the user is monitored, e.g., based on reading an output from the touch sensor. At 1304, gestures are detected from among the touch-based input. At 1306, gesture characteristic profiles are assigned to the detected gestures according to profiling criteria. At 1308, a series of gestures are tabulated and counted based on assigned characteristic profiles and on temporal sequencing of the gestures. At 1310, circumstances for invocation of gesture detection re-calibration are assessed based on the tabulated series of gestures. At 1312, a re-calibration process is initiated in response to the assessment.

ADDITIONAL NOTES & EXAMPLES

Example 1 is a system for gesture recognition in a computing device, the system comprising: computing hardware, including a processor, a data store, and an input device including a touch sensor, the computing hardware containing instructions, that when executed on the processor, cause the computing hardware to implement: a gesture detection engine to monitor touch-based input by the user based on an output from the touch sensor, and to detect gestures from among the touch-based input; a profile assignment engine to assign gesture characteristic profiles to the detected gestures according to profiling criteria; a sequential event logging engine to tabulate and count series of gestures based on assigned characteristic profiles and on temporal sequencing of the gestures; and an analysis engine to assess circumstances for invocation of gesture detection re-calibration based on the tabulated series of gestures In Example 2, the subject matter of Example 1 optionally includes, wherein the gestures include a double-tapping gesture.

In Example 3, the subject matter of any one or more of Examples 1-2 optionally include, wherein the gestures include at least one gesture selected from the group consisting of: a double-tap, device rotation, a swipe, and a device shake.

In Example 4, the subject matter of any one or more of Examples 1-3 optionally include, wherein the touch sensor includes a multi-axial accelerometer.

In Example 5, the subject matter of any one or more of Examples 1-4 optionally include, wherein the touch sensor includes at least one sensor selected from the group consisting of: a device orientation sensor, an acoustic sensor, a strain sensor, and a material deformation sensor.

In Example 6, the subject matter of any one or more of Examples 1-5 optionally include, wherein the computing hardware includes a plurality of diverse touch sensors, and wherein the gesture detection engine is to monitor and integrate output from the plurality of diverse touch sensors.

In Example 7, the subject matter of any one or more of Examples 1-6 optionally include, wherein the gesture detection engine is to apply a set of criteria to discriminate between a user gesture input, and other events sensed by the touch sensor.

In Example 8, the subject matter of any one or more of Examples 1-7 optionally include, wherein the gesture characteristic profiles include profiles representing a plurality of force-of-touch measures.

In Example 9, the subject matter of any one or more of Examples 1-8 optionally include, wherein the sequential event logging engine is to produce a data structure populated with counts of various gestures and non-gesture motion-based events.

In Example 10, the subject matter of any one or more of Examples 1-9 optionally include, wherein the analysis engine is to assess any failed detections of gestures based on the tabulated and counted series of gestures by detection of successful gesture attempts in close succession following events that fail to meet gesture detection criteria.

In Example 11, the subject matter of any one or more of Examples 1-10 optionally include, wherein the analysis engine is to assess any false detections of gestures based on the tabulated and counted series of gestures by detection of undo actions in close succession to detected gestures.

In Example 12, the subject matter of any one or more of Examples 1-11 optionally include, wherein the analysis engine is to assess any repeated gesture attempts following a non-detection of a gesture based on the tabulated and counted series of gestures.

In Example 13, the subject matter of any one or more of Examples 1-12 optionally include, wherein the analysis engine is to initiate a call for gesture detection recalibration in response to a tabulated quantity of false detection/failed detection events having occurred during a monitoring period.

In Example 14, the subject matter of any one or more of Examples 1-13 optionally include, wherein the computing device is a wearable device.

In Example 15, the subject matter of any one or more of Examples 1-14 optionally include, wherein the computing device is a mobile computing device.

Example 16 is at least one computer-readable medium comprising instructions that, when executed on a computing device that includes a processor, a data store, and an input device including a touch sensor, cause the computing device to implement: a gesture detection engine to monitor touch-based input by the user based on an output from the touch sensor, and to detect gestures from among the touch-based input; a profile assignment engine to assign gesture characteristic profiles to the detected gestures according to profiling criteria; a sequential event logging engine to tabulate and count series of gestures based on assigned characteristic profiles and on temporal sequencing of the gestures; and an analysis engine to assess circumstances for invocation of gesture detection re-calibration based on the tabulated series of gestures In Example 17, the subject matter of Example 16 optionally includes, wherein the gestures include a double-tapping gesture.

In Example 18, the subject matter of any one or more of Examples 16-17 optionally include, wherein the gestures include at least one gesture selected from the group consisting of: a device rotation, a swipe, and a device shake.

In Example 19, the subject matter of any one or more of Examples 16-18 optionally include, wherein the gesture detection engine is to apply a set of criteria to discriminate between a user gesture input, and other events sensed by the touch sensor.

In Example 20, the subject matter of any one or more of Examples 16-19 optionally include, wherein the gesture characteristic profiles include profiles representing a plurality of force-of-touch measures.

In Example 21, the subject matter of any one or more of Examples 16-20 optionally include, wherein the sequential event logging engine is to produce a data structure populated with counts of various gestures and non-gesture motion-based events.

In Example 22, the subject matter of any one or more of Examples 16-21 optionally include, wherein the analysis engine is to assess any failed detections of gestures based on the tabulated and counted series of gestures by detection of successful gesture attempts in close succession following events that fail to meet gesture detection criteria.

In Example 23, the subject matter of any one or more of Examples 16-22 optionally include, wherein the analysis engine is to assess any false detections of gestures based on the tabulated and counted series of gestures by detection of undo actions in close succession to detected gestures.

In Example 24, the subject matter of any one or more of Examples 16-23 optionally include, wherein the analysis engine is to assess any repeated gesture attempts following a non-detection of a gesture based on the tabulated and counted series of gestures.

In Example 25, the subject matter of any one or more of Examples 16-24 optionally include, wherein the analysis engine is to initiate a call for gesture detection recalibration in response to a tabulated quantity of false detection/failed detection events having occurred during a monitoring period.

Example 26 is a method for autonomously assessing gesture recognition in a computing device that includes a processor, a data store, and an input device including a touch sensor, the method comprising: monitoring, by the computing device, touch-based input by the user based on an output from the touch sensor; detecting, by the computing device, gestures from among the touch-based input; assigning, by the computing device, gesture characteristic profiles to the detected gestures according to profiling criteria; tabulating and counting, by the computing device, series of gestures based on assigned characteristic profiles and on temporal sequencing of the gestures; and assessing, by the computing device, circumstances for invocation of gesture detection re-calibration based on the tabulated series of gestures In Example 27, the subject matter of Example 26 optionally includes, wherein the gestures include a double-tapping gesture.

In Example 28, the subject matter of any one or more of Examples 26-27 optionally include, wherein the gestures include at least one gesture selected from the group consisting of: a device rotation, a swipe, and a device shake.

In Example 29, the subject matter of any one or more of Examples 26-28 optionally include, further comprising: applying a set of criteria to discriminate between a user gesture input, and other events sensed by the touch sensor.

In Example 30, the subject matter of any one or more of Examples 26-29 optionally include, wherein the gesture characteristic profiles include profiles representing a plurality of force-of-touch measures.

In Example 31, the subject matter of any one or more of Examples 26-30 optionally include, wherein tabulating and counting the series of gestures includes producing a data structure populated with counts of various gestures and non-gesture motion-based events.

In Example 32, the subject matter of any one or more of Examples 26-31 optionally include, wherein assessing the circumstances for invocation of gesture detection re-calibration includes assessing any failed detections of gestures based on the tabulated and counted series of gestures by detecting successful gesture attempts in close succession following events that fail to meet gesture detection criteria.

In Example 33, the subject matter of any one or more of Examples 26-32 optionally include, wherein assessing the circumstances for invocation of gesture detection re-calibration includes assessing any false detections of gestures based on the tabulated and counted series of gestures by detecting undo actions in close succession to detected gestures.

In Example 34, the subject matter of any one or more of Examples 26-33 optionally include, wherein assessing the circumstances for invocation of gesture detection re-calibration includes assessing any repeated gesture attempts following a non-detection of a gesture based on the tabulated and counted series of gestures.

In Example 35, the subject matter of any one or more of Examples 26-34 optionally include, wherein assessing the circumstances for invocation of gesture detection re-calibration produces a call for gesture detection recalibration in response to a tabulated quantity of false detection/failed detection events having occurred during a monitoring period.

Example 36 is a system for autonomously assessing gesture recognition in a computing device that includes processing means and touch sensing means, the system comprising: means for monitoring touch-based input by the user based on an output from the touch sensing means; means for detecting gestures from among the touch-based input; means for assigning gesture characteristic profiles to the detected gestures according to profiling criteria; means for tabulating and counting series of gestures based on assigned characteristic profiles and on temporal sequencing of the gestures; and means for assessing circumstances for invocation of gesture detection re-calibration based on the tabulated series of gestures In Example 37, the subject matter of Example 36 optionally includes, wherein the gestures include a double-tapping gesture.

In Example 38, the subject matter of any one or more of Examples 36-37 optionally include, wherein the gestures include at least one gesture selected from the group consisting of: a device rotation, a swipe, and a device shake.

In Example 39, the subject matter of any one or more of Examples 36-38 optionally include, further comprising: means for applying a set of criteria to discriminate between a user gesture input, and other events sensed by the touch sensing means.

In Example 40, the subject matter of any one or more of Examples 36-39 optionally include, wherein the gesture characteristic profiles include profiles representing a plurality of force-of-touch measures.

In Example 41, the subject matter of any one or more of Examples 36-40 optionally include, wherein the means for tabulating and counting the series of gestures includes means for producing a data structure populated with counts of various gestures and non-gesture motion-based events.

In Example 42, the subject matter of any one or more of Examples 36-41 optionally include, wherein the means for assessing the circumstances for invocation of gesture detection re-calibration includes means for assessing any failed detections of gestures based on the tabulated and counted series of gestures by detecting successful gesture attempts in close succession following events that fail to meet gesture detection criteria.

In Example 43, the subject matter of any one or more of Examples 36-42 optionally include, wherein the means for assessing the circumstances for invocation of gesture detection re-calibration includes means for assessing any false detections of gestures based on the tabulated and counted series of gestures by detecting undo actions in close succession to detected gestures.

In Example 44, the subject matter of any one or more of Examples 36-43 optionally include, wherein the means for assessing the circumstances for invocation of gesture detection re-calibration includes assessing any repeated gesture attempts following a non-detection of a gesture based on the tabulated and counted series of gestures.

In Example 45, the subject matter of any one or more of Examples 36-44 optionally include, wherein the means for assessing the circumstances for invocation of gesture detection re-calibration produces a call for gesture detection recalibration in response to a tabulated quantity of false detection/failed detection events having occurred during a monitoring period.

In Example 46, the subject matter of any one or more of Examples 36-45 optionally include, wherein the touch sensing means includes a multi-axial accelerometer.

In Example 47, the subject matter of any one or more of Examples 36-46 optionally include, wherein the touch sensing means includes at least one sensor selected from the group consisting of: a device orientation sensor, an acoustic sensor, a strain sensor, and a material deformation sensor.

In Example 48, the subject matter of any one or more of Examples 36-47 optionally include, wherein the computing hardware includes a plurality of diverse touch sensing means, and wherein the gesture detection engine is to monitor and integrate output from the plurality of diverse touch sensing means.

In Example 49, the subject matter of any one or more of Examples 36-48 optionally include, wherein the computing device is a wearable device.

In Example 50, the subject matter of any one or more of Examples 36-49 optionally include, wherein the computing device is a mobile computing device.

In Example 51, at least one computer-readable medium comprises instructions that, when executed on a computing device that includes a processor, a data store, and an input device including a touch sensor, cause the computing device to implement the subject matter of any one or more of Examples 26-35.

In Example 52, a system for autonomously assessing gesture recognition in a computing device that includes processing means and touch sensing means comprises means for implementing the subject matter of any one or more of Examples 26-35.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A system for gesture recognition in a computing device; the system comprising:
   computing hardware, including a processor, a data store, and an input device including a touch sensor, the computing hardware containing instructions, that when executed on the processor, cause the computing hardware to implement:
   a gesture detection engine to monitor touch-based input by the user based on an output from the touch sensor, and to detect gestures from among the touch-based input;
   a profile assignment engine to assign gesture characteristic profiles to the detected gestures according to profiling criteria;
   a sequential event logging engine to tabulate and count series of gestures based on assigned characteristic profiles and on temporal sequencing of the gestures; and
   an analysis engine to assess circumstances for invocation of gesture detection re-calibration based on the tabulated series of gestures.

2. The system of claim 1, wherein the touch sensor includes a multi-axial accelerometer.

3. The system of claim 1, wherein the computing hardware includes a plurality of diverse touch sensors, and wherein the gesture detection engine is to monitor and integrate output from the plurality of diverse touch sensors.

4. The system of claim 1, wherein the gesture detection engine is to apply a set of criteria to discriminate between a user gesture input, and other events sensed by the touch sensor.

5. The system of claim 1, wherein the gesture characteristic profiles include profiles representing a plurality of force-of-touch measures.

6. The system of claim 1, wherein the sequential event logging engine is to produce a data structure populated with counts of various gestures and non-gesture motion-based events.

7. The system of claim 1, wherein the analysis engine is to assess any failed detections of gestures based on the tabulated and counted series of gestures by detection of successful gesture attempts in close succession following events that fail to meet gesture detection criteria.

8. The system of claim 1, wherein the analysis engine is to assess any false detections of gestures based on the tabulated and counted series of gestures by detection of undo actions in close succession to detected gestures.

9. The system of claim 1, wherein the analysis engine is to assess any repeated gesture attempts following a non-detection of a gesture based on the tabulated and counted series of gestures.

10. The system of claim 1, wherein the analysis engine is to initiate a call for gesture detection recalibration in response to a tabulated quantity of false detection/failed detection events having occurred during a monitoring period.

11. The system of claim 1, wherein the computing device is a wearable device.

12. The system of claim 1, wherein the computing device is a mobile computing device.

13. At least one non-transitory computer-readable medium comprising instructions that, when executed on a computing device that includes a processor, a data store, and an input device including a touch sensor, cause the computing device to implement:
   a gesture detection engine to monitor touch-based input by the user based on an output from the touch sensor, and to detect gestures from among the touch-based input;
   a profile assignment engine to assign gesture characteristic profiles to the detected gestures according to profiling criteria;
   a sequential event logging engine to tabulate and count series of gestures based on assigned characteristic profiles and on temporal sequencing of the gestures; and
   an analysis engine to assess circumstances for invocation of gesture detection re-calibration based on the tabulated series of gestures.

14. The at least one computer-readable medium of claim 13, wherein the gesture characteristic profiles include profiles representing a plurality of force-of-touch measures.

15. The at least one computer-readable medium of claim 13, wherein the sequential event logging engine is to produce a data structure populated with counts of various gestures and non-gesture motion-based events.

16. The at least one computer-readable medium of claim 13, wherein the analysis engine is to assess any failed detections of gestures based on the tabulated and counted series of gestures by detection of successful gesture attempts in close succession following events that fail to meet gesture detection criteria.

17. The at least one computer-readable medium of claim 13, wherein the analysis engine is to assess any false detections of gestures based on the tabulated and counted series of gestures by detection of undo actions in close succession to detected gestures.

18. The at least one computer-readable medium of claim 13, wherein the analysis engine is to assess any repeated gesture attempts following a non-detection of a gesture based on the tabulated and counted series of gestures.

19. The at least one computer-readable medium of claim 13, wherein the analysis engine is to initiate a call for gesture detection recalibration in response to a tabulated quantity of false detection/failed detection events having occurred during a monitoring period.

20. A method for autonomously assessing gesture recognition in a computing device that includes a processor, a data store, and an input device including a touch sensor, the method comprising:

monitoring, by the computing device, touch-based input by the user based on an output from the touch sensor;

detecting, by the computing device, gestures from among the touch-based input;

assigning, by the computing device, gesture characteristic profiles to the detected gestures according to profiling criteria;

tabulating and counting, by the computing device, series of gestures based on assigned characteristic profiles and on temporal sequencing of the gestures; and assessing, by the computing device, circumstances for invocation of gesture detection re-calibration based on the tabulated series of gestures.

21. The method of claim 20, wherein tabulating and counting the series of gestures includes producing a data structure populated with counts of various gestures and non-gesture motion-based events.

22. The method of claim 20, wherein assessing the circumstances for invocation of gesture detection re-calibration includes assessing any failed detections of gestures based on the tabulated and counted series of gestures by detecting successful gesture attempts in close succession following events that fail to meet gesture detection criteria.

23. The method of claim 20, wherein assessing the circumstances for invocation of gesture detection re-calibration includes assessing any false detections of gestures based on the tabulated and counted series of gestures by detecting undo actions in close succession to detected gestures.

24. The method of claim 20, wherein assessing the circumstances for invocation of gesture detection re-calibration includes assessing any repeated gesture attempts following a non-detection of a gesture based on the tabulated and counted series of gestures.

25. The method of claim 20, wherein assessing the circumstances for invocation of gesture detection re-calibration produces a call for gesture detection recalibration in response to a tabulated quantity of false detection/failed detection events having occurred during a monitoring period.

* * * * *